Patented May 6, 1924.

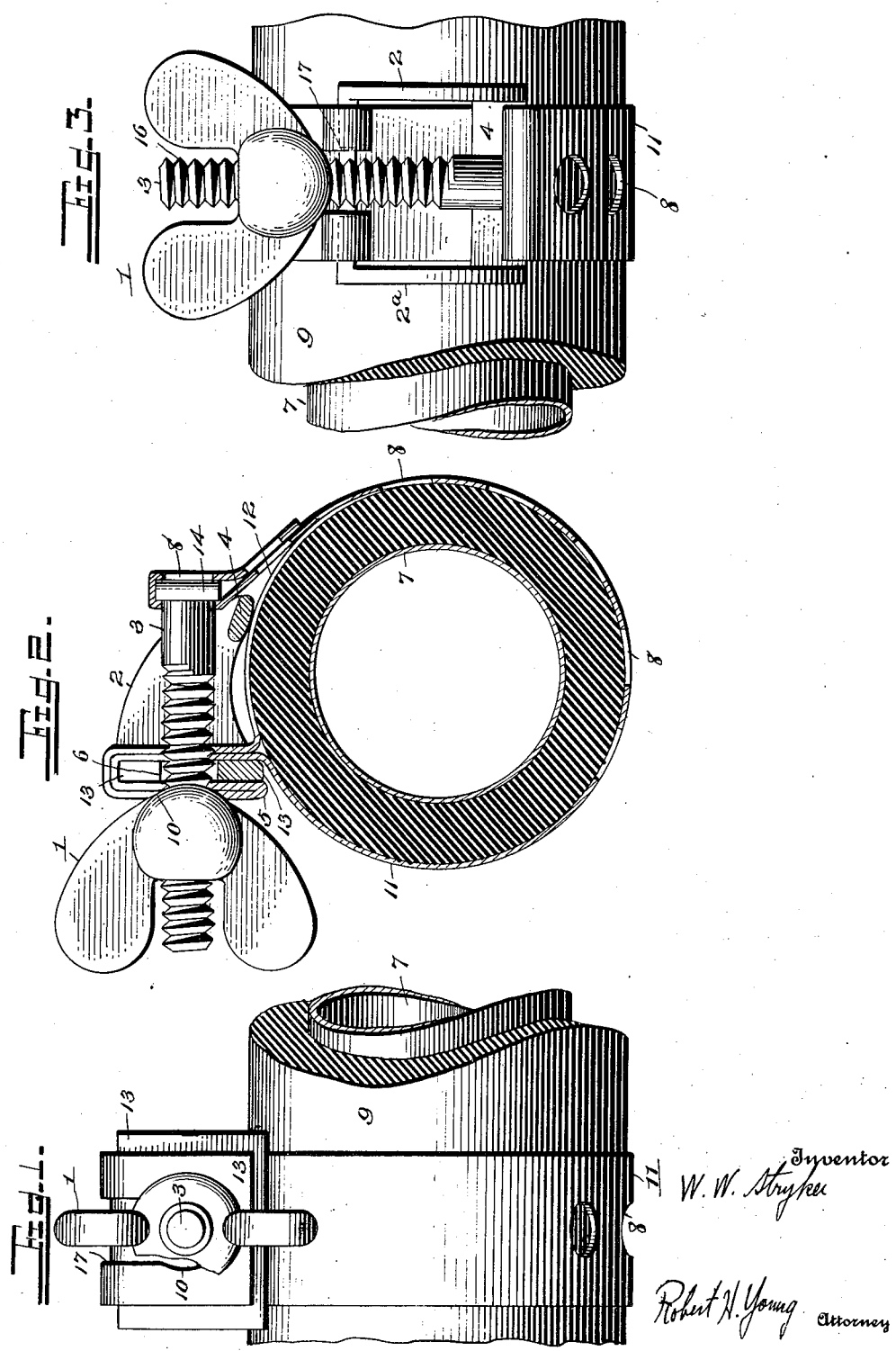

1,493,007

UNITED STATES PATENT OFFICE.

WALTER W. STRYKER, OF DAYTON, OHIO; EDWARD T. JONES ADMINISTRATOR OF SAID WALTER W. STRYKER, DECEASED.

ADJUSTABLE HOSE CLAMP.

Application filed November 17, 1921. Serial No. 515,748.

*To all whom it may concern:*

Be it known that I, WALTER W. STRYKER, a citizen of the United States, residing at Dayton, in the county of Montgomery and State of Ohio, have invented certain new and useful Improvements in Adjustable Hose Clamps, of which the following is a specification.

This invention relates to certain improvements in fastening devices adapted for use in connection with tubular or cylindrical bodies, and more particularly adapted for securing together two such bodies.

The object of the present invention is to provide a new and improved clamp which is simple and durable in construction, readily adjustable for hose of various diameters, and arranged to permit convenient placing of the clamp in position, and to securely fasten the parts such as a hose and pipe together.

A further object is to provide a clamping device which when tightened will distribute pressure equally over the perimeter of the object being clamped. This is an essential feature in the clamping of hose on pipes as it will obviate a possible leakage due to bulging of the hose caused by an irregular internal surface of the clamps or an unequally distributed binding effect of the clamp around the hose.

It is therefore proposed to provide a clamp with a strap punched for adjustment purposes by means of a T-head screw bolt therein. The screw-threaded portion of the bolt is adapted to pass through a U-shaped slot in a retaining shoe fastened to one end of the strap. The present devices of this nature using such a shoe have been found to be unsatisfactory in that the forward ends of the shoe are separate and not braced, thus allowing same to spread out of alignment. In case the clamp was placed very near one edge of the hose, one of the ends of the shoe could very easily extend over in such a position that it would be inoperative as far as producing a clamping effect is concerned.

A further difficulty encountered in such a type of clamp is that the ends of the shoe being separate and of small bearing surface are allowed to penetrate the hose and destroy the texture thereof. A further objection is that in actual operation the clamp, immediately referred to, produces a clamping effect which is unequally distributed over the surface of the hose and causes a bulging or buckling of the latter, and consequent leakage at the joint being clamped. This is especially true when the hose is too large for the pipe.

In order to obviate these difficulties, it is proposed to provide a shoe with a bridge between the forward ends thereof, and to bend the strap double over the cross bar at the rear end of the shoe, and to extend the strap in such a way that a single thickness at the end of the strap will pass under the bridge and terminate a short distance therefrom substantially in alignment with the remaining major portion of the strap. This construction provides for an equal distribution of the clamping effect and by the provision of the bridge and protecting strap thereunder also obviates the possibility of the shoe prongs spreading or cutting the texture of the hose or causing a buckling or bulging of the hose when a clamping pressure is applied thereto.

With the foregoing and other objects which shall appear as the description proceeds, the invention resides in the combination of parts and in the details of construction, hereinafter described and claimed, it being understood that changes therein may be made without departing from the spirit of the invention, the specific embodiment of which is illustrated in the attached drawings, in which:

Figure 1 is a side view of a hose surrounding a pipe showing an end view of the clamp in operative position, with the ball of the wing nut partly broken away to show the countersunk recess around the slot in the shoe, which permits the ball of the wing nut to force the metal of the strap into said countersunk recess, thereby forming a socket 10 for the ball of the wing nut.

Figure 2 is a cross section through the hose and pipe and the clamp in operative position.

Figure 3 is a side view of the pipe and hose showing a plan view of the connecting means of the ends of the clamp in locked position.

Referring more specifically to the drawings, a hose 9 is shown fitted over a pipe 7. The clamping device for keeping the hose 9 in clamped relation around the pipe 7 consists in the following parts assembled in the manner about to be described. A shoe is provided having a cross bar 13 and legs 2 and 2ª extending from either side of said cross bar and tapering down at their forward ends, at which point they are connected by means of a bridge member 4 therebetween. The lower surfaces of the legs 2 and 2ª are cut away forming arcuate clearance recesses as shown at 6. The bridge 4, legs 2 and 2ª, and cross bar 13 of the shoe thus form the boundaries of a hole through which one end of the strap is passed. As shown in Figure 2, the strap 11 is bent over the upper edge of the cross bar 13, and further bent over itself at 5 and extended over the upper edge of the cross bar 13 and extended therefrom downwardly through the recess above described. The strap 11 is then curved and passed underneath the bridge 4 to form a protective strap, designated in the drawings at 12. The double thickness of the strap 11 bent over the rear face of the cross bar 13 is provided with a U-shaped slot 17 to conform with a similar slot in the cross bar 13 of the shoe. The strap 11 is provided with a plurality of apertures or slots 8 and through any suitable one of these slots 8 a bolt 3 is passed. Bolt 3 is provided with a T-head 14 at one end and screw threads 16 at the other.

The remaining portion of the strap 11 between the slot, through which the bolt is passed, and the end immediately referred to, is bent to conform with the circular outline of the strap in clamping position.

The device is thus easily applied, adjusted, and operated, it only being necessary to insert the bolt 3 in a suitable slot 8, and apply the clamp assembly around the object to be clamped. The bolt 3 is then swung into the socket 10, the ball wing nut 1 being applied and screwed on the thread 16 until the proper clamping pressure has been applied.

It will be readily seen that there is thus provided a clamp which will distribute pressure equally around the entire surface of the clamped object; and also that the legs 2 and 2ª of the shoe are prevented from spreading, and consequent bulging of the hose, by the bridge 4, and further that the protective strap 12 prohibits the legs 2 and 2ª or the bridge 4 from cutting the texture of the hose 9 to which the clamp is applied.

While I have described my invention as pertaining to the accompanying illustration, it is readily realized that changes in the details of construction may occur, and it is therefore my desire to limit the scope of my invention only in view of the broadest interpretation of the appended claims.

Having thus described my invention, I claim:

1. A clamping device comprising a shoe having a slotted cross bar and legs extending from said bar, a bridge member connecting the legs of said shoe, a clamping strap for encircling the object to be clamped, said strap being bent over said cross bar and extending under said bridge, a plurality of slots in said strap registering with the slot in said cross bar, a connecting member fitted in the free end of said strap and adapted to engage the registering slots of said shoe and strap attached thereto, and means for operating said tightening means.

2. A clamping device, comprising a shoe having a cross bar with a U-shaped slot therein, said shoe having curved legs extending from said bar a bridge connecting the legs of said shoe, a clamping strap for encircling the object to be clamped, said strap being bent over said cross bar, doubled back over itself, and passed under said bridge to form a protective strap therefor, adjustment slots in said strap for receiving a T-head screw bolt at the free end of said strap, slots in the bent-over portion of said strap in register with said cross bar slot to receive the free end of said screw bolt, a ball wing nut for engaging said screw bolt, for the purpose of tightening said clamping device, and a countersunk bevelled edge around the slot in the cross bar of said shoe, for receiving the portion of the strap directly under the ball of the wing nut.

In testimony whereof I have affixed my signature.

WALTER W. STRYKER.